United States Patent
Hakhumyan

(10) Patent No.: US 11,038,798 B2
(45) Date of Patent: *Jun. 15, 2021

(54) STORING DATA IN ASSOCIATION WITH A KEY WITHIN A HASH TABLE AND RETRIEVING THE DATA FROM THE HASH TABLE USING THE KEY

(71) Applicant: INTERNATIONAL BUSINESS MACHINES CORPORATION, Armonk, NY (US)

(72) Inventor: Aram Hakhumyan, Maynooth (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,685

(22) Filed: Sep. 13, 2019

(65) Prior Publication Data

US 2020/0007447 A1  Jan. 2, 2020

Related U.S. Application Data

(63) Continuation of application No. 15/348,024, filed on Nov. 10, 2016, now Pat. No. 10,469,383.

(51) Int. Cl.
*H04L 12/28* (2006.01)
*H04L 12/743* (2013.01)
(Continued)

(52) U.S. Cl.
CPC ...... *H04L 45/7453* (2013.01); *G06F 16/9014* (2019.01); *H04L 47/2483* (2013.01); *H04L 63/0263* (2013.01)

(58) Field of Classification Search
CPC .......... H04L 45/7453; H04L 47/02483; H04L 63/0263
See application file for complete search history.

(56) References Cited

U.S. PATENT DOCUMENTS 6,754,662 B1  6/2004 Li
7,650,429 B2  1/2010 Panigrahy et al.
(Continued)

OTHER PUBLICATIONS

List of IBM Patents or Patent Applications Treated As Related; (Appendix P), Date Filed Sep. 13, 2019; 2 pages.
(Continued)

*Primary Examiner* — Abdelnabi O Musa
(74) *Attorney, Agent, or Firm* — Cantor Colburn LLP; Anthony V England

(57) ABSTRACT

Computer-implemented methods and systems are provided for storing data in association with a key within a hash table and for retrieving the data from the hah table using the key. The hash table comprises a plurality of storage tables. Each of the storage tables is associated with a respective primary hashing function for determining which of a plurality of buckets of the storage table should be used for storing data associated with a particular key. Each of the buckets is configured to store a limited number of elements. Each element comprises respective stored data and a representation of the respective key associated with the stored data. Each of the storage tables is further associated with a respective secondary hashing function with which the representations of the keys of the elements of that storage table are generated. The secondary hashing function for each of the storage tables is the primary hashing function for at least one of the other storage tables.

17 Claims, 4 Drawing Sheets

(51) Int. Cl.
  *G06F 16/901* (2019.01)
  *H04L 12/851* (2013.01)
  *H04L 29/06* (2006.01)

(56) References Cited

U.S. PATENT DOCUMENTS

| | | |
|---|---|---|
| 8,849,825 B1 | 9/2014 | McHugh et al. |
| 8,938,469 B1 | 1/2015 | Keen et al. |
| 9,148,387 B2 | 9/2015 | Lin et al. |
| 10,326,697 B2 | 6/2019 | Hakhumyan |
| 2002/0073068 A1* | 6/2002 | Guha ............... G06F 16/9014 |
| 2006/0143168 A1* | 6/2006 | Rossmann .......... G06F 16/9014 |
| 2015/0058595 A1 | 2/2015 | Gura et al. |
| 2015/0341473 A1 | 11/2015 | Dumitrescu et al. |
| 2016/0092125 A1 | 3/2016 | Cowling et al. |
| 2016/0140045 A1 | 5/2016 | Bergeron |
| 2016/0350302 A1 | 12/2016 | Lakshman |
| 2017/0300592 A1* | 10/2017 | Breslow .............. G06F 16/9014 |
| 2018/0026652 A1* | 1/2018 | Cutter .................. G06F 9/5027 |
| | | 341/76 |
| 2018/0131611 A1 | 5/2018 | Hakhumyan |

OTHER PUBLICATIONS

Lu et al., Perfect Hashing for Network Applications; 2006 IEEE International Symposium on Information Theory, Date of conference: Jul. 9-14, 2006, pp. 2774-2778.

Ramakrishna et al., "Efficient Hardware Hashing Functions for High Performance Computers" IEEE Transactions on Computers (vol. 46, Issue: 12), pp. 1378-1381, Date of current version: Aug. 6, 2002.

Zink et al., "Efficient Hash Tables for Network Applications" SpringerPlus, May 15, 2015; 19 pgs.

\* cited by examiner

STORING DATA IN ASSOCIATION WITH A KEY WITHIN A HASH TABLE AND RETRIEVING THE DATA FROM THE HASH TABLE USING THE KEY

DOMESTIC PRIORITY

This application is a continuation of the legally related U.S. application Ser. No. 15/348,024 filed Nov. 10, 2016, which is fully incorporated herein by reference.

BACKGROUND

The present invention relates to hash tables. In particular, it relates to methods and systems for storing data in association with a key within a hash table and retrieving the data from the hash table using the key.

Hash tables (or hash maps) can be used to implement associative arrays (or maps or dictionaries) which store data (or values) in association with a key (i.e. as a key-value pair) such that each key is only used once. Hash tables make use of a hash function to compute an index into an array of buckets (or slots). In this way, for a given key, a bucket in which the data for that key should be stored can be identified by applying the hash function to the key. This may also be referred to as mapping the key to a bucket. Multiple different keys may map to the same bucket within a hash table. Therefore, hash tables are typically configured to store multiple key-value pairs or elements within each bucket. This means that, in addition to identifying the bucket in which data should be stored by applying the hash function, it may be necessary to search through the multiple elements within that bucket to find the element that corresponds to a particular key.

Hash tables may be used as a component of a variety of different systems. An example of a system which makes use of hash tables is a network element. Network elements, such as routers or switches, perform operations relative to packet flows that pass through them. Such network elements may use hash tables to store data relating to a particular packet flow in association with a key which identifies the packet flow. Typically, when a network element receives a packet, it performs packet classification to determine the identity of the packet flow by parsing specific fields within message headers such as MAC addresses, IP addresses and/or Tunnel Endpoint Identifiers (TEIDs). The network element may then retrieve the data about the relevant packet flow from the hash table by using a combination of the specific fields which identify the packet flow as a key. The network element may also (or alternatively) record information about the processing of the packet by writing data to the packet flow data stored in the hash table using the same key.

SUMMARY

According to an aspect of the invention, there is provided a computer-implemented method of storing data in association with a key within a hash table. The hash table comprises a plurality of storage tables. Each of the storage tables is associated with a respective primary hashing function for determining which of a plurality of buckets of the storage table should be used for storing data associated with a particular key. Each of the buckets is configured to store a limited number of elements. Each element comprises respective stored data and a representation of the respective key associated with the stored data. Each of the storage tables is further associated with a respective secondary hashing function with which the representations of the keys of the elements of that storage table are generated. The method receives a request to store data in association with a key. The method identifies a bucket in one of the storage tables in which the data is to be stored by applying the primary hashing function for that storage table to the key. The method stores the data in an element of the bucket together with a representation of the key generated using the secondary hashing function associated with that storage table. The secondary hashing function for at least one of the storage tables is the primary hashing function for at least one of the other storage tables.

According to another aspect of the invention, there is provided a computer-implemented method for retrieving data stored in association with a key within a hash table. The hash table comprises a plurality of storage tables. Each of the storage tables is associated with a respective primary hashing function for determining which of a plurality of buckets of the storage table should be used for storing data associated with a particular key. Each of the buckets is configured to store a limited number of elements. Each element comprises respective stored data and a representation of the respective key associated with the stored data. Each of the storage tables is further associated with a respective secondary hashing function with which the representations of the keys of the elements of that storage table are generated. The method receives a request to retrieve the data stored in association with the key. The method identifies buckets in which the data to be retrieved may have been stored by applying the primary hashing function for each table to the key. The method identifies an element in which the data has been stored by comparing the representations of the keys of each of the elements in the identified buckets of each storage table with a representation of the key generated using the secondary hashing function associated with that storage table. The method provides the data stored in the identified element. The secondary hashing function for at least one of the storage tables is the primary hashing function for at least one of the other storage tables.

According to another aspect of the invention, there is provided a system comprising a memory and a controller. The controller is configured to retrieve data stored in association with a key within a hash table in the memory. The hash table comprises a plurality of storage tables. Each of the storage tables is associated with a respective primary hashing function for determining which of a plurality of buckets of the storage table should be used for storing data associated with a particular key. Each of the buckets is configured to store a limited number of elements. Each element comprises respective stored data and a representation of the respective key associated with the stored data. Each of the storage tables is further associated with a respective secondary hashing function with which the representations of the keys of the elements of that storage table are generated. The controller is configured to retrieve the data by receiving a request to retrieve the data stored in association with the key; identifying buckets in which the data to be retrieved may have been stored by applying the primary hashing function for each table to the key; identifying an element in which the data has been stored by comparing the representations of the keys of each of the elements in the identified buckets of each storage table with a representation of the key generated using the secondary hashing function associated with that storage table; and providing the data stored in the identified element. The secondary hashing function for at least one of the storage tables is the primary hashing function for at least one of the other storage tables.

BRIEF DESCRIPTION OF THE DRAWINGS

Embodiments of the invention will now be described, by way of example only, with reference to the accompanying drawings, in which.

DETAILED DESCRIPTION

In the description that follows and in the figures, certain embodiments of the invention are described. However, it will be appreciated that the invention is not limited to the embodiments that are described and that some embodiments may not include all the features that are described below. It will be evident, however, that various modifications and changes may be made herein without departing from the broader spirit and scope of the invention as set forth in the appended claims.

Figure 1:
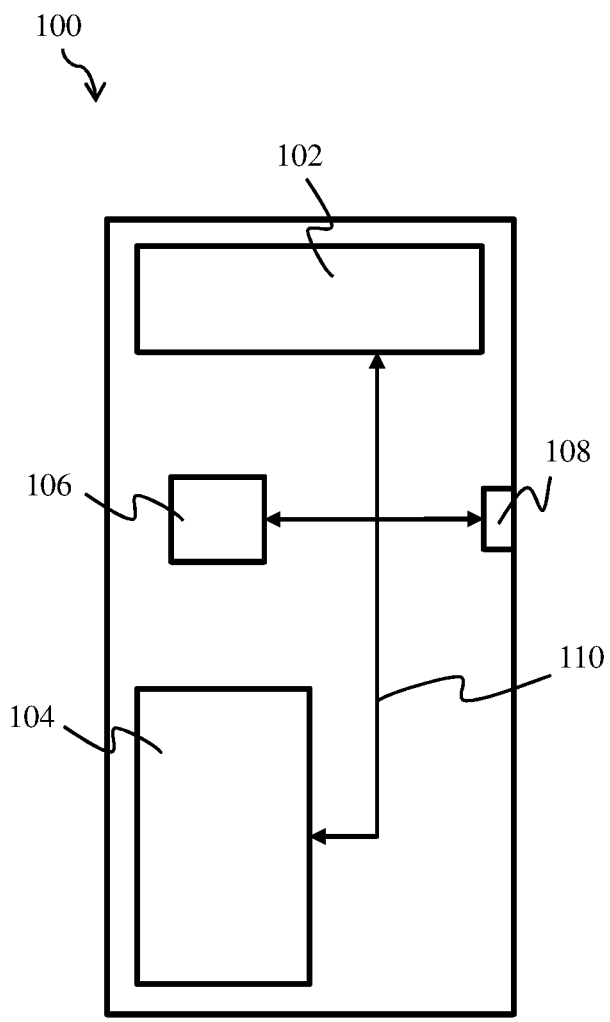
FIG. 1 schematically illustrates an exemplary computer system upon which embodiments of the invention may run.

FIG. 1 of the accompanying drawings schematically illustrates an exemplary computer system 100 upon which embodiments of the present invention may run. The exemplary computer system 100 comprises a computer-readable storage medium 102, a memory 104, a processor 106 and one or more interfaces 108, which are all linked together over one or more communication busses 110. The exemplary computer system 100 may take the form of a conventional computer system, such as, for example, a desktop computer, a personal computer, a laptop, a tablet, a smartphone, a smart watch, a virtual reality headset, a server, a mainframe computer, and so on.

The computer-readable storage medium 102 and/or the memory 104 may store one or more computer programs (or software or code) and/or data. The computer programs stored in the computer-readable storage medium 102 may include an operating system for the processor 106 to execute in order for the computer system 100 to function. The computer programs stored in the computer-readable storage medium 102 and/or the memory 104 may include computer programs according to embodiments of the invention or computer programs that, when executed by the processor 106, cause the processor 106 to carry out a method according to an embodiment of the invention. As examples, the memory 104 may be any of Static Random-Access Memory (SRAM), Single Data Rate Synchronous Dynamic Random-Access Memory (SDRAM) or Double Data Rate Synchronous Dynamic Random-Access Memory (DDR SDRAM).

The processor 106 may be any data processing unit suitable for executing one or more computer readable program instructions, such as those belonging to computer programs stored in the computer-readable storage medium 102 and/or the memory 104. As part of the execution of one or more computer-readable program instructions, the processor 106 may store data to and/or read data from the computer-readable storage medium 102 and/or the memory 104. The processor 106 may comprise a single data processing unit or multiple data processing units operating in parallel or in cooperation with each other. The processor 106 may, as part of the execution of one or more computer readable program instructions, store data to and/or read data from the computer-readable storage medium 102 and/or the memory 104.

The one or more interfaces 108 may comprise a network interface enabling the computer system 100 to communicate with other computer systems across a network. The network may be any kind of network suitable for transmitting or communicating data from one computer system to another. For example, the network could comprise one or more of a local area network, a wide area network, a metropolitan area network, the internet, a wireless communications network, and so on. The computer system 100 may communicate with other computer systems over the network via any suitable communication mechanism/protocol. The processor 106 may communicate with the network interface via the one or more communication busses 110 to cause the network interface to send data and/or commands to another computer system over the network. Similarly, the one or more communication busses 110 enable the processor 106 to operate on data and/or commands received by the computer system 100 via the network interface from other computer systems over the network.

The interface 108 may alternatively or additionally comprise a user input interface and/or a user output interface. The user input interface may be arranged to receive input from a user, or operator, of the system 100. The user may provide this input via one or more user input devices (not shown), such as a mouse (or other pointing device, track-ball or keyboard. The user output interface may be arranged to provide a graphical/visual output to a user or operator of the system 100 on a display (or monitor or screen) (not shown). The processor 106 may instruct the user output interface to form an image/video signal which causes the display to show a desired graphical output. The display may be touch-sensitive enabling the user to provide an input by touching or pressing the display.

It will be appreciated that the architecture of the computer system 100 illustrated in FIG. 1 and described above is merely exemplary and that systems having different architectures using alternative components or using more components (or fewer) may be used instead.

Figure 2:
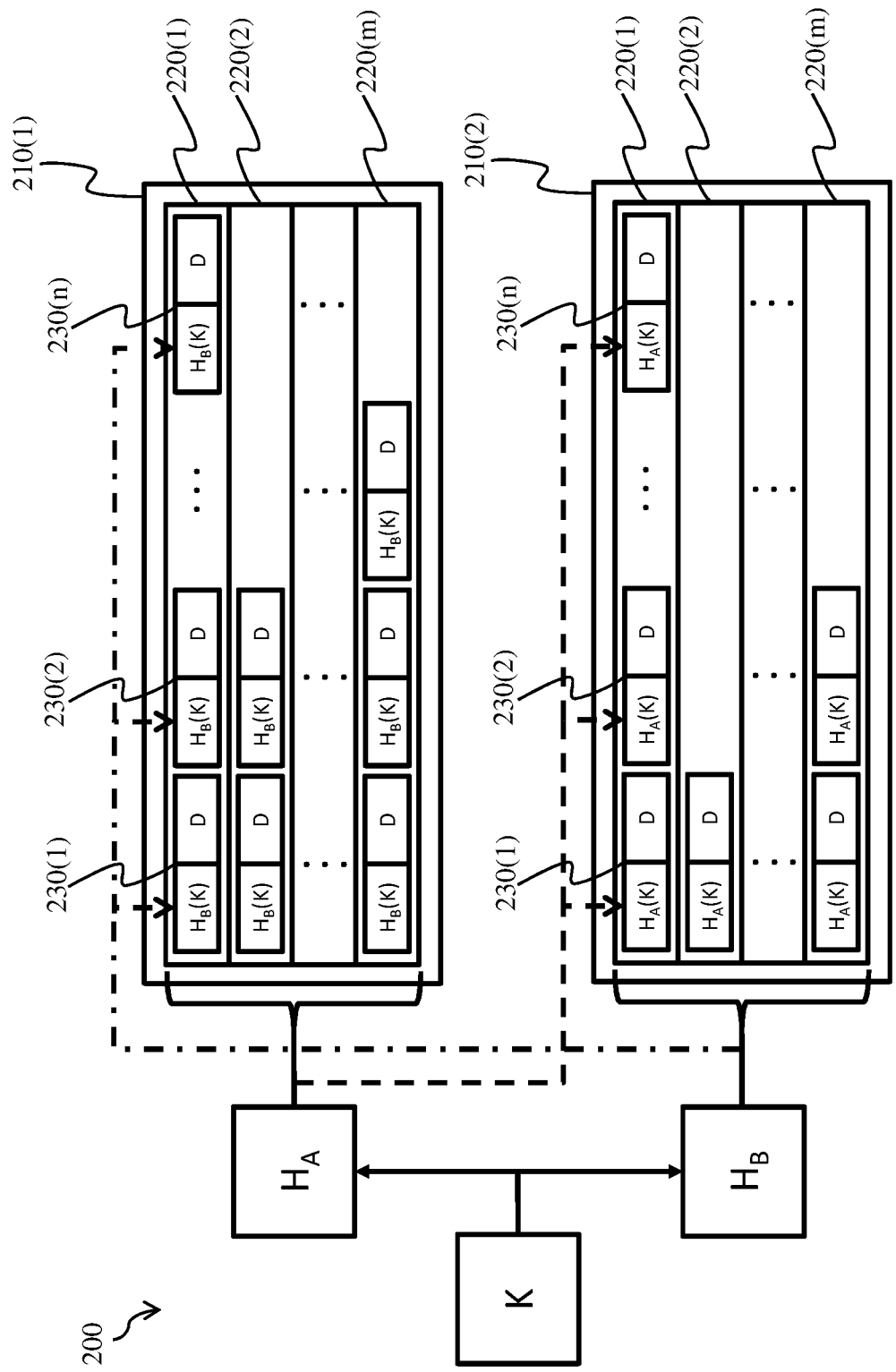
FIG. 2 of the accompanying drawings schematically illustrates an exemplary hash table 200 as used by embodiments of the present invention.

FIG. 2 of the accompanying drawings schematically illustrates an exemplary hash table 200 as used by embodiments of the present invention. The hash table 200 comprises a plurality of storage tables 210 which each comprise a plurality of buckets (or slots) 220. For example, the exemplary hash table 200 illustrated in FIG. 2 comprises two storage tables 210(1) and 210(2), each of which comprises a number of buckets 220(1) to 220(m). However, it will be appreciated that the hash table 200 may make use of more than two storage tables 210 and that the number of buckets 220 in each storage table 210 may vary and may indeed differ between each of the storage tables 210 in the hash table 200.

Each of the storage tables 210 is associated with a respective primary hashing function (or algorithm) HA or HB which determines which of the buckets 220 of that storage table 210 should be used to store the data D for a particular key K. In other words, the primary hashing function HA or HB maps a key K onto a bucket 220 within the storage table 210 with which the primary hashing function HA or HB is associated. This means that the bucket 220 in which the data D associated with a particular key K can be determined for each of the storage tables 210 by applying the primary hashing function HA or HB to the key K. Therefore, by applying the primary hashing function HA or HB to the key K, a plurality of buckets 220 can be identified—one bucket 220 in each of the plurality of tables 210 of the hash table 200—in which the data D associated with that key K may be stored. In general, the primary hashing functions serve to map an arbitrary key K onto a more limited fixed range of values. Where the range of values that may be produced by the primary hashing function HA or HB differs from the number of buckets 220 within the storage table 210 with which the primary hashing function HA or HB is associated, the mapping may involve applying a modulo operation to the output of the primary hashing function HA or HB to match the output range of the primary hashing function HA or HB to the number of available buckets 220.

Each of the buckets 220 within a storage table 210 is configured to store data D in each of a limited number of elements (or entries or records) 230(1) to 230(n). The number of elements that each bucket 220 is able to store may be a predetermined number set during the creation of the storage table. Alternatively, the number of elements may be dynamically determined based on the amount of memory that is available to store the hash table. The number of elements that each bucket 220 is able to store may be increased or decreased during use in response to various conditions, such as the number of elements already stored in the table 210 or bucket 220 and the amount of memory currently available for storing the hash table 200. The number of elements that each bucket 220 is able to store may vary between different buckets in the table, or may be the same for all buckets in a table 210. Similarly, the number of elements that each bucket 220 in different tables 210 may store may be different or the same.

As discussed earlier, multiple different keys K may map to the same bucket 220 within a storage table 210 of the hash table 200. This leads to a requirement to search through the multiple elements 230 that may be stored in that bucket 220 to identify whether an element 230 exists in that bucket 220. In situations where large numbers of elements are stored in a bucket, this requirement to search through each of the elements in the bucket can significantly impact the performance of the hash table 200 potentially resulting in a long time being taken to locate a matching element within a given bucket. However, by utilizing multiple storage tables 210 within the hash table 200, this impact can be reduced. This is because, for a given key K, multiple buckets 220—one for each storage table 210—will be identified as candidate locations in which the data D for that key K may be stored. Since multiple tables are used, the candidate bucket in each table will contain fewer elements which need to be searched through. Furthermore, each bucket 220 can be independently searched, enabling the search process to be parallelized and therefore completed faster. This can benefit performance of the hash table in situations where the lookup speed is important, such as when the hash table 200 is used in a network element. This ability to parallelize the search process may come at the cost of having to apply multiple hashing functions to the key K—one for each storage table 210.

Each element 230 can store data D together with a representation HA(K) or HB(K) of the key K that is associated with that data D. That is to say, instead of storing the entire key K in the elements 230, a representation of the key is stored instead. The representations HA(K) or HB(K) of the keys K that are stored in the buckets 220 of a particular storage table 210 are generated by a secondary hashing function (or algorithm) HA or HB that is associated with that storage table 210. By storing a representation HA(K) or HB(K) of the key K that is produced by a hashing function HA or HB, the size of the data that is stored can be reduced. This is because the output of the hashing function HA or HB is typically smaller than the size of the key K that is put into it. This means that the amount of data which the hash table 200 is required to store can be reduced since only the (smaller) representations of the keys K associated with the data D in each element are stored. Meanwhile, it is still possible to check, given a particular key K, whether an element 230 exists which stores data D for that key K within a bucket 220 of a storage table 210 of the hash table 200 by applying the secondary hashing function for that storage table 210 to the key K and then comparing that representation of the key to the representations of the keys stored in the elements 230 of the bucket 220.

The primary hashing function and the secondary hashing function for each storage table 210 are different from each other so that the results of applying each hashing function to a particular key are likely to be different from each other. The secondary hashing function of at least one of the storage tables is the primary hashing function of at least one of the other storage tables. This enables the calculation of the primary hashing function for a key for one of the storage tables to be re-used as the representation of the key produced by the secondary hashing function for the at least one other storage tables. Whilst in some embodiments, some of the secondary hashing functions may not be the primary hashing function for any other storage tables, in other embodiments, the secondary hashing functions of each of the storage tables may be the primary hashing function of at least one of the other storage tables. This means that the hash table 200 only makes use of as many hashing functions HA or HB as there are storage tables 210 within the hash table 200.

In some embodiments, each of the primary hashing functions may be the secondary hashing function for one other storage table. That is to say, each of the hashing functions HA or HB is only used twice within the hash table 200, once as the primary hashing function for one of the storage tables 210 and once as the secondary hashing function for another one of the storage tables 210. For example, as illustrated in FIG. 2, the hash table 200 may comprise a pair of storage tables 210(1) and 210(2) wherein the primary hashing function HA that is associated with a first table 210(1) of the pair of storage tables is the secondary hashing function for a second table 210(2) of the pair and the primary hashing function HB that is associated with the second table 210(2) is the secondary hashing function for the first storage table 210(1). As a further example, for a hash table 200 comprising four storage tables 210, the storage tables 210 might be arranged as two pairs of tables, with the primary hashing functions of each table in each of the pairs being used as the secondary hashing function for the other table in the pair. However, it will be appreciated that other configurations may be used instead. For example, given the exemplary hash table 200 comprising four storage tables 210, the storage tables 210 might be arranged in a "chain" configuration, whereby the primary hashing function for the first table may be used as the secondary hashing function for the second table, the primary hashing function for the second table may be used as the secondary hashing function for the third table, the primary hashing function for the third table may be used as the secondary hashing function for the fourth table and the primary hashing function for the fourth table may be used as the secondary hashing function for the first table. Naturally, the skilled reader will understand that any number of storage tables 210 may be arranged in such a "chain" configuration.

In other embodiments, some of the hashing functions HA or HB may be used fewer or more than twice within the hash table 200. For example, the primary hashing function for one of the storage tables 210 may be the secondary hashing function for two other storage tables 210, while another primary hashing function used within the hash table might not be used as a secondary hashing function for any other storage tables 210. For example, returning to the above discussed exemplary hashing table 200 comprising four storage tables 210, the primary hashing function for the first table may be the secondary hashing function for each of the other tables (i.e. the second, third and fourth tables), the primary hashing function for the second table may be the secondary hashing function for the first table and the primary hashing functions for the third and fourth tables might not be used as the secondary hashing functions for any of the other tables. Other similar configurations will also be apparent to the skilled reader.

The primary hashing functions HA or HB may be chosen such that they are orthogonal to each other. For example, each of the primary hashing functions HA or HB that are used with the hash table 200 may be based on the polynomial division of the key by a respective k-degree polynomial, wherein the respective k-degree polynomials for each of the primary hashing functions are orthogonal to each other. In other words, the k-degree polynomials are chosen by targeting that the remainder of the polynomial division of an input key by one of the k-degree polynomials does not overlap with the remainder of the polynomial division of the same input key with any of the other k-degree polynomials. By choosing the primary hashing functions HA or HB in this way, the likelihood of so-called hash-collisions occurring can be reduced or even eliminated. This means that if two primary hashing functions HA or HB chosen in this way are applied to two keys K1 and K2 respectively, the representations HA(K1) or HB(K2) of the keys K1 and K2 will only be the same if the two keys K1 and K2 are the same (i.e. HA(K1)=HB(K2) only when K1=K2).

Figure 3:
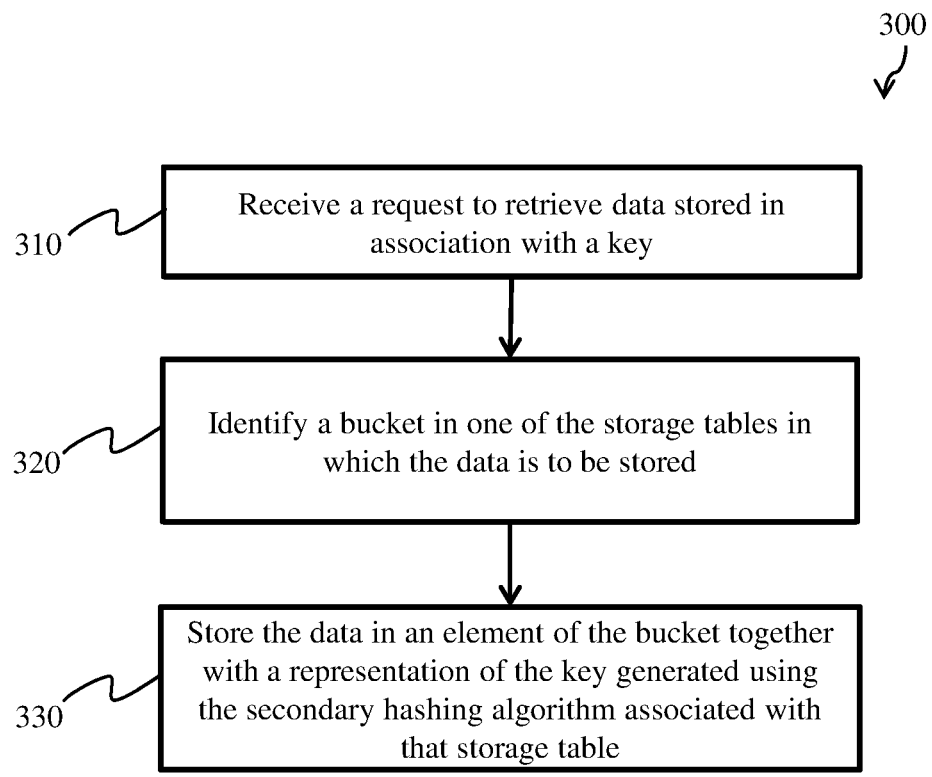
FIG. 3 of the accompanying drawings is a diagram that schematically illustrates a computer-implemented method 300 for storing data D in association with a key K within the hash table 200 according to embodiments of the invention.

FIG. 3 of the accompanying drawings is a diagram that schematically illustrates a computer-implemented method 300 for storing data D in association with a key K within the hash table 200 according to embodiments of the invention.

At a step 310, the method 300 receives a request to store data D in association with a key K. This request may be explicit, such as by way of a request received from a computer system via a network or from another computer program via an inter-process communication mechanism. Alternatively, the request may be implicit, such as by incorporating the method 300 as part of a larger computer program to provide data needed for the rest of the computer program.

At a step 320, the method 300 identifies a bucket 220 in one of the storage tables 210 in which the data D is to be stored by applying the primary hashing function HA or HB for that storage table 210 to the key K. Whilst there may be multiple buckets 220 (i.e. candidate buckets) in which the data D could be stored—one bucket for each storage table 210 as indicated by the primary hashing functions—the data D will only be stored in one of the buckets 220. To identify the bucket 220 in which the data will be stored, the method may involve identifying all the candidate buckets 220—one for each storage table 210—by applying each of the primary hashing functions to the key. The method 300 may then choose the candidate bucket 220 which has the least number of elements stored in it as the bucket 220 in which the data is to be stored. Other techniques for picking one of the candidate buckets may be used instead of or in addition, such as, for example, using a "round robin" technique to allocate elements across the buckets evenly. As part of the process of identifying the bucket 220 in which the data is to be stored, the method 300 may check whether an element already exists for the key K. This may be conducted by comparing the representations HA(K) or HB(K) of the key stored as part of each element 230 in the candidate bucket 220 of each storage table 210 against a representation of the key K generated using the secondary hashing function for that table 210. If any matches are found, then it may be determined that an element 230 already exists to store data D for that key K. In this case, the bucket which contains the existing element 230 may be identified as the bucket 220 in which the data is to be stored. This check may be conducted in a manner which takes advantage of parallelisation in much the same manner as discussed in more detail below.

At a step 330, the method 300 stores the data D in an element 230 of the identified bucket 220 together with a representation HA(K) or HB(K) of the key that is generated using the secondary hashing function HA or HB associated with the storage table 210 that contains the identified bucket 220. Where it is determined that the identified bucket 220 already contains an element 230 associated with that key, the data D may be stored in that element 230. Otherwise, a new element 230 may be inserted into the identified bucket 220 to store the data D. Alternatively, a pre-existing blank (or null) element 230 of the identified bucket 220 which does not currently store any data may be used instead.

Figure 4:
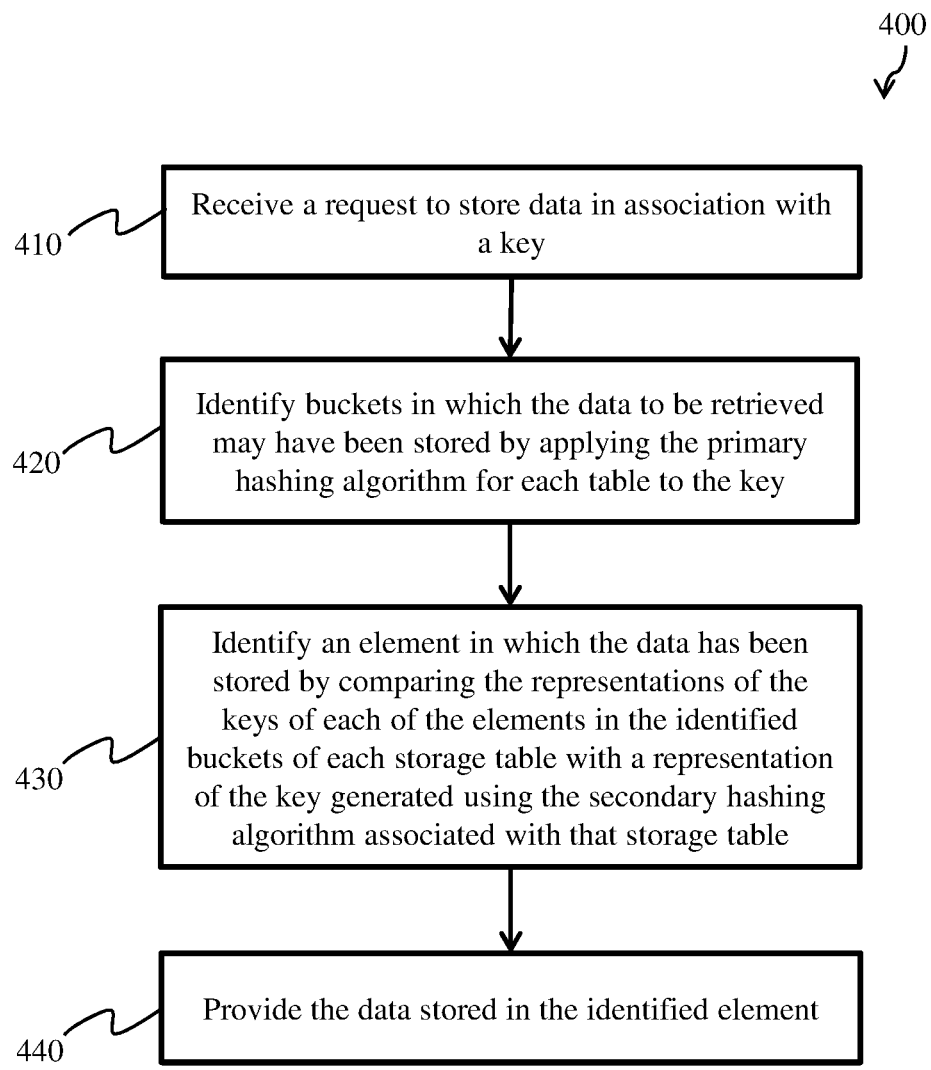
FIG. 4 of the accompanying drawings is a diagram that schematically illustrates a computer-implemented method 400 for retrieving data D stored in association with a key K within the hash table 200 according to embodiments of the invention.

FIG. 4 of the accompanying drawings is a diagram that schematically illustrates a computer-implemented method 400 for retrieving data D stored in association with a key K within the hash table 200 according to embodiments of the invention.

At a step 410, the method 400 receives a request to retrieve the data D which is stored in association with the key K. This request may be explicit, such as by way of a request received from a computer system via a network or from another computer program via an inter-process communication mechanism. Alternatively, the request may be implicit, such as by incorporating the method 300 as part of a larger computer program to provide data needed for the rest of the computer program.

At a step 420, the method 400 identifies buckets 220 in which the data D to be retrieved may have been stored by applying the primary hashing function HA or HB for each table 210 to the key K.

At a step 430, the method 400 identifies an element 230 in which the data has been stored by comparing the representations HA(K) or HB(K) of the keys of each of the elements 230 in the identified buckets 220 of each storage table 210 with a representation HA(K) or HB(K) of the key K generated using the secondary hashing function HA or HB associated with that storage table 210.

Although steps 420 and 430 are illustrated as being sequential in FIG. 4, it will be appreciated that these steps may be carried out in parallel. That is to say, separate threads of execution may be used to apply the primary hashing functions HA or HB for each storage table 210 to the key K and then to search through any elements 230 stored in that bucket to find an element with a stored key representation HA(K) or HB(K) which matches a representation HA(K) or HB(K) of the key K generated using the secondary hashing function HA or HB for that table. This means that the process of searching the candidate bucket 220 of each table 210 can be carried out substantially simultaneously, allowing the element 230 which is storing the data D to be retrieved to be identified quicker. Once one of the threads of execution has identified the element 230 which is storing the data D associated with the key K, it may signal to the other threads of execution to cease their processing. Similarly, even where steps 420 and 430 are carried out sequentially, the steps may not be carried out in their entirety and instead, the processing may iterate between the two steps. For example, the candidate buckets for each storage table may be searched sequentially in turn until the element which is storing the data D associated with the key K is found at which point the method may move on to step 440 without searching through (or possibly even identifying) the candidate buckets 220 of any remaining tables 210.

It will further be appreciated that since the secondary hashing function for each of the storage tables is a primary hashing function for one of the other storage tables, the results of applying the primary hashing function to the key K to identify a bucket 220 within one of the storage tables 210 can be reused as the representation of the key used to search through the bucket 220 of another table 210 which has that hashing function as its secondary hashing function. This can further reduce the time required to retrieve data from the hash table 200.

At a step 440, the method 400 provides the data D stored in the identified element 230.

In some embodiments, the hash table 200 may form part of a system, such as the exemplary computer system 100 upon which embodiments of the present invention may run. The processor 106 of the computer system 100 may act as a controller configured to retrieve and/or store data D in association with a key K within the hash table 200 which may be stored in the memory 104 and/or the computer readable storage medium 102 of the computer system 100. For example, the processor 106 may execute one or more computer programs stored in the computer-readable storage medium 102 and/or the memory 104 to cause the processor to carry out the above-described method 300 for storing data D in association with a key K within the hash table 200 and/or the above-described method 400 for retrieving data D stored in association with a key K within the hash table 200.

In some embodiments, the system may be a network element, such as a router, a switch or a data collector. The network element may store a hash table 200 in its memory 104 which is configured to store packet flow data for various packet flows that the network element may encounter. The packet flow data may be stored in the hash table 200 in association with a packet flow key which identifies the particular packet flow to which the packet flow data relates. The network element may be configured to derive a packet flow key from the characteristics of a packet. Any characteristics of the packet may be used to identify the packet flow and thereby form a packet flow key (either on their own or in combination with other characteristics of the packet. For example, the packet flow key may be derived from one or more of a MAC address, an IP address, a Port or a Tunnel Endpoint Identifier (TEID). However, other packet characteristics may be used as well (or instead). Having derived a packet flow key from the characteristics of a packet (which may, for example, have been received via a network interface of the system), the network element may then retrieve the packet flow data for the packet flow to which the packet belongs from the hash table 200 by using the derived packet flow key. This packet flow data may contain statistics about the packet flow (such as a number of packets received or transmitted which belonged to that packet flow) and/or rules (such as routing or firewall rules) which dictate how the network element should handle packets belonging to that packet flow. Having retrieved the packet flow data, the network element may, therefore, use the packet flow data to perform an operation on the packet. For example, the operation that the network element performs may be one or more of forwarding the packet, encrypting the packet, decrypting the packet, prioritizing the transmission of the packet according to a Quality of Service (QOS) requirement, transcoding the packet, or preventing the forwarding of the packet. Optionally, the network element may also write data to the hashtable 200 to update the packet flow data for a particular packet flow, such as be recording packet flow statistics or updating rules.

Typically, the memory 104 that is available in a network element for storing the hash table 200 will be limited by the physical capacity of the memory that is available within the network element which is usually relatively low. This low availability of physical memory can place a significant limitation on the number of data flows (or sessions) that a particular network element can support. However, by storing representations of the keys produced by the secondary hashing algorithms for each storage table rather than the full keys, the memory requirement of the hash table 200 is effectively compressed. Therefore, the network element may be able to support more data flows (or sessions) using the same amount of memory 104. Meanwhile, the results of applying the primary hashing functions to the key can be reused since the secondary hashing function of each table is the primary hashing function of another table. Therefore, the processing requirements need not be significantly increased.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A network element comprising:
a memory configured to store a hash table comprising packet flow data for packet flows through the network element, a packet flow key that identifies which packet flow a packet belongs to, and a plurality of storage tables, each storage table being associated with a respective primary hashing function for determining which of a plurality of buckets of the storage table should be used for storing data associated with a particular key, each bucket being configured to store a limited number of elements, each element comprising respective stored data and a representation of the respective key associated with the stored data, wherein each storage table is further associated with a respective secondary hashing function with which the representations of the keys of the elements of that storage table are generated; and
a controller configured to:
receive a first packet;
derive a first packet flow key from characteristics of the first packet;
retrieve packet flow data for the packet flow to which the first packet belongs from the hash table by applying the respective primary hashing function and the respective secondary hashing function to the first packet flow key; and
perform an operation on the first packet based on the packet flow data, wherein the respective secondary hashing function for at least one of the storage tables is the same as the respective primary hashing function for at least one of the other storage tables and wherein the respective primary hashing function for the at least one of the storage tables is different from the respective secondary hashing function for the at least one of other the storage tables.

2. The network element of claim 1, wherein the respective secondary hashing function for each of the storage tables is the respective primary hashing function for at least one of the other storage tables.

3. The network element of claim 1, wherein each of the respective primary hashing functions is the respective secondary hashing function for one other storage table.

4. The network element of claim 1, wherein the hash table comprises a pair of storage tables wherein the respective primary hashing function associated with a first storage table of the pair is the respective secondary hashing function for a second storage table of the pair and wherein the respective primary hashing function associated with the second storage table is the respective secondary hashing function for the first storage table.

5. The network element of claim 1, wherein each of the respective primary hashing functions is based on polynomial division of the key by a respective k-degree polynomial, wherein the respective k-degree polynomials for each of the primary hashing functions are orthogonal to each other, wherein k is a positive integer value.

6. The network element of claim 1, wherein the packet flow key is derived from one or more of: a media access control (MAC) address, an internet-protocol (IP) address, a Port or a Tunnel Endpoint Identifier (TEID).

7. The network element of claim 1, wherein the operation comprises one or more of: forwarding the packet, encrypting the packet, decrypting the packet, prioritising the transmission of the packet according to a Quality of Service (QOS) requirement, transcoding the packet, or preventing the forwarding of the packet.

8. The network element of claim 1, wherein the packet flow data includes statistics about the packet flow which dictate how the network element should handle packets belonging to the packet flow.

9. A computer-implemented method for operating a network element, the method comprising:
receiving, by the network element, a packet from a memory, wherein the memory configured to store a hash table comprising packet flow data for packet flows through the network element, a packet flow key that identifies which packet flow a packet belongs to, and a plurality of storage tables, each storage table being associated with a respective primary hashing function for determining which of a plurality of buckets of the storage table should be used for storing data associated with a particular key, each bucket being configured to store a limited number of elements, each element comprising respective stored data and a representation of the respective key associated with the stored data, wherein each storage table is further associated with a respective secondary hashing function with which the representations of the keys of the elements of that storage table are generated;
deriving a packet flow key from characteristics of the packet;

retrieve packet flow data for the packet flow to which the first packet belongs from a hash table by applying the respective primary hashing function and the respective secondary hashing function to the packet flow key; and
perform an operation on the packet based on the packet flow data, wherein the respective secondary hashing function for at least one of the storage tables is the same as the respective primary hashing function for at least one of the other storage tables and wherein the respective primary hashing function for the at least one of the storage tables is different from the respective secondary hashing function for the at least one of other the storage tables.

10. The computer-implemented method of claim 9, wherein each storage table being associated with a respective primary hashing function or determining which of a plurality of buckets of the storage table should be used for storing data associated with a particular key and each storage table is further associated with a respective secondary hashing function with which the representations of the keys of the elements of that storage table are generated.

11. The computer-implemented method of claim 9, wherein the secondary hashing function for each of the storage tables is the respective primary hashing function for at least one of the other storage tables.

12. The computer-implemented method of claim 9, wherein each of the respective primary hashing functions is the secondary hashing function for one other storage table.

13. The computer-implemented method of claim 9, wherein the hash table comprises a pair of storage tables wherein the respective primary hashing function associated with a first storage table of the pair is the secondary hashing function for a second storage table of the pair and wherein the respective primary hashing function associated with the second storage table is the secondary hashing function for the first storage table.

14. The computer-implemented method of claim 9, wherein each of the respective primary hashing functions is based on polynomial division of the key by a respective k-degree polynomial, wherein the respective k-degree polynomials for each of the respective primary hashing functions are orthogonal to each other, wherein k is a positive integer value.

15. The computer-implemented method of claim 9, wherein the packet flow key is derived from one or more of: a media access control (MAC) address, an internet protocol (IP) address, a Port or a Tunnel Endpoint Identifier (TEID).

16. The computer-implemented method of claim 9, wherein the operation comprises one or more of: forwarding the packet, encrypting the packet, decrypting the packet, prioritising the transmission of the packet according to a Quality of Service (QOS) requirement, transcoding the packet, or preventing the forwarding of the packet.

17. The computer-implemented method of claim 9, wherein the packet flow data includes statistics about the packet flow which dictate how the network element should handle packets belonging to the packet flow.

\* \* \* \* \*